(12) United States Patent
Itou

(10) Patent No.: US 7,731,092 B2
(45) Date of Patent: Jun. 8, 2010

(54) OPTICAL INFORMATION READING APPARATUS

(75) Inventor: Kunihiko Itou, Chiryu (JP)

(73) Assignee: Denso Wave Incorporated, Tokyo (JP)

( * ) Notice: Subject to any disclaimer, the term of this patent is extended or adjusted under 35 U.S.C. 154(b) by 1218 days.

(21) Appl. No.: 11/206,291

(22) Filed: Aug. 18, 2005

(65) Prior Publication Data

US 2006/0038145 A1 Feb. 23, 2006

(30) Foreign Application Priority Data

Aug. 19, 2004 (JP) ............................. 2004-239460
Dec. 7, 2004 (JP) ............................. 2004-354217

(51) Int. Cl.
G06K 7/10 (2006.01)
G06K 9/24 (2006.01)
G06K 5/04 (2006.01)

(52) U.S. Cl. ............................. 235/472.01; 235/462.2; 235/462.21; 235/462.08; 250/566

(58) Field of Classification Search ............ 235/472.01, 235/462.2, 462.21, 435, 462.08; 250/566
See application file for complete search history.

(56) References Cited

U.S. PATENT DOCUMENTS

| | | | | |
|---|---|---|---|---|
| 4,011,435 | A * | 3/1977 | Phelps et al. ................. | 235/454 |
| 4,603,262 | A * | 7/1986 | Eastman et al. .............. | 250/566 |
| 4,760,248 | A * | 7/1988 | Swartz et al. .......... | 235/462.21 |
| 4,806,742 | A * | 2/1989 | Swartz et al. .......... | 235/472.01 |
| 4,877,949 | A * | 10/1989 | Danielson et al. ....... | 235/462.21 |
| 4,939,356 | A * | 7/1990 | Rando et al. .............. | 235/462.2 |
| 5,280,161 | A * | 1/1994 | Niwa ...................... | 235/462.42 |
| 5,598,007 | A * | 1/1997 | Bunce et al. ................. | 250/566 |
| 5,734,153 | A * | 3/1998 | Swartz et al. .......... | 235/462.21 |
| 5,783,811 | A * | 7/1998 | Feng et al. ............. | 235/462.42 |
| 5,786,581 | A * | 7/1998 | Eastman et al. ............. | 235/455 |
| 5,949,057 | A | 9/1999 | Feng | |
| 6,347,163 | B2 | 2/2002 | Roustaei | |
| 6,651,888 | B1 * | 11/2003 | Gurevich et al. ....... | 235/462.21 |
| 6,877,664 | B1 * | 4/2005 | Oliva .................... | 235/462.42 |

(Continued)

FOREIGN PATENT DOCUMENTS

EP 0 349 770 A1 1/1990

(Continued)

OTHER PUBLICATIONS

Office Action dated Feb. 19, 2008 in corresponding Japanese Patent Application No. 2004-354217 (and English translation).

(Continued)

*Primary Examiner*—Daniel Walsh
(74) *Attorney, Agent, or Firm*—Posz Law Group, PLC

(57) ABSTRACT

In an optical information reading apparatus, a pickup unit has a predetermined reading position, and is configured to optically pickup information of a target when the information is located at the reading position. A marker beam irradiating unit includes a light beam source configured to emit a light beam. The marker beam irradiating unit includes a beam pattern forming lens arranged to allow the emitted light beam to enter thereinto. The pattern forming lens is configured to irradiate a marker beam based on the emitted light beam. The marker beam has a predetermined beam pattern composed of at least one linear beamlet to indicate the reading position of the pickup unit.

18 Claims, 10 Drawing Sheets

U.S. PATENT DOCUMENTS

| | | | |
|---|---|---|---|
| 7,021,542 B2* | 4/2006 | Patel et al. | 235/454 |
| 7,182,260 B2* | 2/2007 | Gurevich et al. | 235/462.08 |
| 7,201,321 B2* | 4/2007 | He et al. | 235/462.2 |
| 7,270,274 B2* | 9/2007 | Hennick et al. | 235/462.43 |
| 7,279,696 B2* | 10/2007 | Itou | 250/566 |
| 2001/0003346 A1* | 6/2001 | Feng | 235/472.01 |
| 2002/0036233 A1* | 3/2002 | Itou | 235/454 |
| 2003/0019934 A1* | 1/2003 | Hunter et al. | 235/462.2 |
| 2004/0173681 A1* | 9/2004 | Toyama et al. | 235/454 |
| 2005/0052749 A1* | 3/2005 | Rope et al. | 359/618 |
| 2005/0284942 A1* | 12/2005 | Gurevich et al. | 235/462.21 |
| 2006/0038145 A1* | 2/2006 | Itou | 250/566 |
| 2006/0043187 A1* | 3/2006 | He et al. | 235/462.2 |
| 2006/0043191 A1* | 3/2006 | Patel et al. | 235/462.21 |
| 2006/0066844 A1* | 3/2006 | Moribe et al. | 356/237.5 |
| 2006/0113389 A1* | 6/2006 | Barkan | 235/462.21 |
| 2006/0118635 A1* | 6/2006 | Joseph et al. | 235/462.24 |
| 2006/0151608 A1* | 7/2006 | Kricorissian et al. | 235/462.21 |
| 2006/0266838 A1* | 11/2006 | Vinogradov et al. | 235/462.45 |
| 2007/0095916 A1* | 5/2007 | Joseph et al. | 235/454 |
| 2007/0127330 A1* | 6/2007 | Mitsuda | 369/44.26 |
| 2007/0171090 A1* | 7/2007 | Newman et al. | 340/815.45 |
| 2008/0265035 A1* | 10/2008 | Vinogradov et al. | 235/462.41 |

FOREIGN PATENT DOCUMENTS

| | | |
|---|---|---|
| EP | 997-760 | 10/1998 |
| JP | A-05-266234 | 10/1993 |
| JP | A-11-338959 | 12/1999 |
| JP | A-2000-029979 | 1/2000 |
| JP | A-2001-067432 | 3/2001 |
| JP | A-2001-155110 | 6/2001 |
| JP | A-2003-317030 | 11/2003 |

OTHER PUBLICATIONS

Official Communication issued from the German Patent Office on Apr. 22, 2009 in the corresponding German patent application No. 10 2005 039 197.4-53 (with English translation thereof).

* cited by examiner

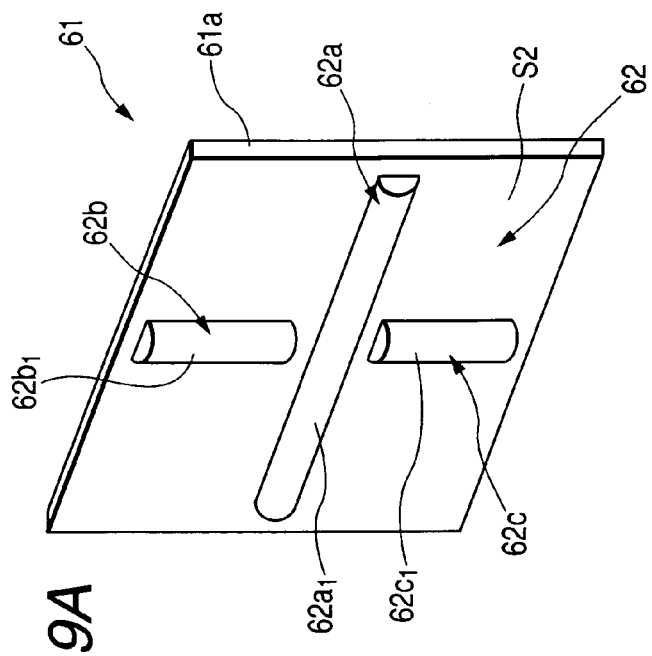
FIG. 8A
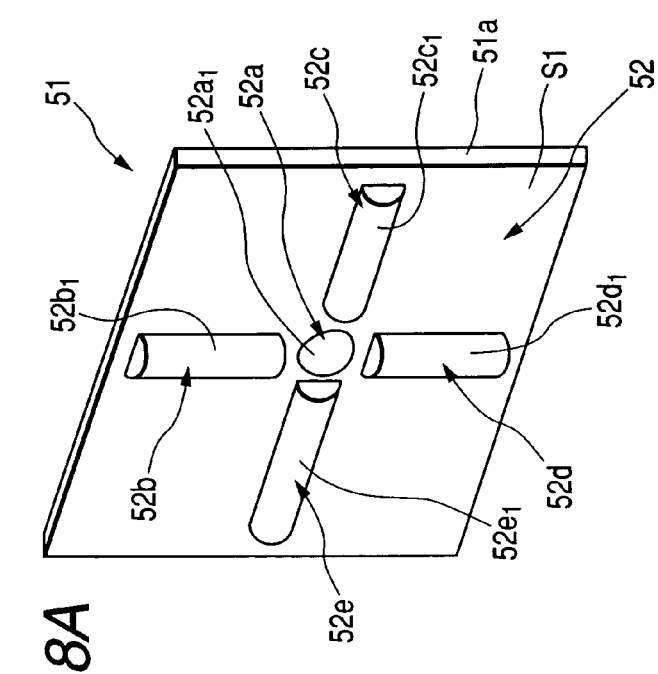
FIG. 9A
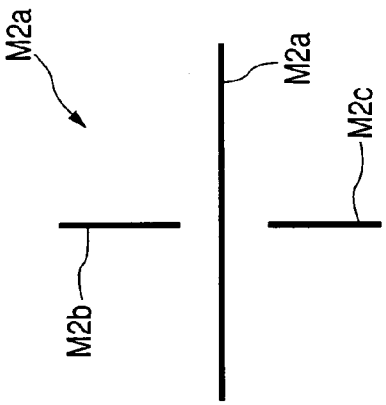
FIG. 9B
FIG. 8B

OPTICAL INFORMATION READING APPARATUS

CROSS REFERENCE TO RELATED APPLICATION

This application is based on Japanese Patent Applications 2004-239460 and 2004-354217 filed on Aug. 19, 2004 and Dec. 7, 2004, respectively. This application claims the benefit of priority from each of the Japanese Patent Applications, so that the descriptions of which are all incorporated herein by reference.

BACKGROUND OF THE INVENTION

1. Field of the Invention

The present invention relates to apparatuses for optically reading a target to which optically readable information, such as an information code, for example, a barcode or a two-dimensional code, is attached.

2. Description of the Related Art

Handheld optical information readers aim at reading information codes optically readable, such as barcodes, two-dimensional codes, or other similar codes. In this specification, a target itself or a target to which optically readable information is attached is collectively referred to as the "target".

For improving the usability of handheld optical information readers, handheld optical information readers that can read an information code positioned at a distance therefrom have been provided.

The handheld optical information reader has a handheld body case provided at its one end portion with a reading window. In addition, the handheld optical information reader also has a photodetector, such as a CCD (Charge-Coupled Device) area sensor, an imaging optics with an imaging lens, and a reading unit composed of a light illuminating device, such as an LED (light emitting diode). The photodetector, the imaging unit, and the reading unit are installed in the body case, respectively.

In order to align the reading window (the photodetector) with the target, handheld optical information readers have been commonly provided with a marker beam irradiating unit using a laser diode (LD), an LED, or other similar light emitting devices. The marker beam irradiating unit is operative to irradiate a marker beam onto the target for indicating a reader's reading position, such as a field of view (FOV) of the photodetector, and/or the center position of the FOV, onto the target.

An example of such marker beam irradiating units is disclosed in U.S. Pat. No. 6,347,163. The disclosed marker beam irradiating unit uses, as a light source, an LD capable of emitting a marker beam with high-visibility, and a diffraction grating through which the emitted beam is irradiated onto the target as various designs thereon.

Specifically, as illustrated in FIG. 15, the marker beam irradiating unit 3 is placed on one side, such as an upper side, of a CCD area sensor 1 and an imaging optics 2. As illustrated in FIG. 16, the marker beam irradiating unit 3 consists of a laser diode 4, a collimation lens 5 disposed at the light emitting side thereof and coaxially aligned therewith, and a diffraction grating 6 disposed at the collimated light output side thereof and coaxially aligned therewith.

In the marker beam irradiating unit 3, a laser beam emitted from the laser diode 4 is collected by the collimation lens 5. The collected beam is transferred therethrough to enter a hologram plane of the diffraction grating 6. The incident laser beam is diffracted by the hologram plane so that the first-order diffraction beamlets and the second-order diffraction beamlets are irradiated from the hologram plane as a marker beam M with a predetermined beam pattern (diffraction pattern) onto a target R (see FIGS. 15 and 17).

For example, the diffraction pattern of the marker beam M consists of four L-shaped pattern elements corresponding to the four corner portions of a field of view V of the CCD area sensor 1 (see FIG. 15). In addition, the diffraction pattern of the marker beam M consists of a cross pattern element indicating the center of the field of view V.

However, because the diffraction beamlets, such as the first-order diffraction beamlets and the second-order diffraction beamlets, form the beam pattern (diffraction pattern) of the marker beam, as illustrated in FIG. 17, the diffraction beamlets are represented on the target R as dot-patterns. That is, the set of dot patterns form a linear pattern on the target R, which may cause the beam pattern on the target R to be smudged, and may deteriorate the visual effects of the beam pattern.

In addition, when scanning a one-dimensional code, such as a barcode, optical information readers with a marker beam irradiating unit can use a marker beam linearly extending in a horizontal direction as illuminating light for scanning the barcode.

Some optical information readers using a marker beam irradiating unit with such a diffraction grating, however, cannot use a marker beam emitted from the marker beam irradiating unit as the illuminating light for scanning the barcode.

Note that the collimate lens 5 has been commonly used as a collective lens for collecting the laser beam emitted from the laser diode 4. Collimate lenses have a function of transferring a laser beam collected thereby with a substantially horizontally prolate ellipsoid profile in its lateral cross section. This may deteriorate the efficiency of transferring the collected beam, causing a greater loss of laser beam.

SUMMARY OF THE INVENTION

The present invention has been made on the background so that preferable embodiments of optical reading apparatuses of the present invention are capable of clearly irradiating a marker beam with a predetermined beam pattern onto a target.

According to one aspect of the present invention, there is provided an optical information reading apparatus. The apparatus includes a pickup unit having a predetermined reading position. The pickup unit is configured to optically pickup information of a target when the information is located at the reading position. The apparatus includes a marker beam irradiating unit. The marker beam irradiating unit includes a light beam source configured to emit a light beam, and a beam pattern forming lens arranged to allow the emitted light beam to enter thereinto. The pattern forming lens is configured to irradiate a marker beam based on the emitted light beam. The marker beam has a predetermined beam pattern composed of at least one linear beamlet to indicate the reading position of the pickup unit.

BRIEF DESCRIPTION OF THE DRAWINGS

Other objects and aspects of the invention will become apparent from the following description of embodiments with reference to the accompanying drawings in which:

FIG. 8A is a perspective view schematically illustrating the structure of a pattern forming lens of a marker beam irradiating device according to a third embodiment of the present invention;

FIG. 8B is a view schematically illustrating the pattern shape of a predetermined marker beam pattern on a target, which is formed by the marker beam irradiating device according to the third embodiment of the present invention;

FIG. 9A is a perspective view schematically illustrating the structure of a pattern forming lens of a marker beam irradiating device according to a fourth embodiment of the present invention;

FIG. 9B is a view schematically illustrating the pattern shape of a predetermined marker beam pattern on a target, which is formed by the marker beam irradiating device according to the fourth embodiment of the present invention;

DETAILED DESCRIPTION OF EMBODIMENTS OF THE INVENTION

Embodiments of the present invention will be described hereinafter with reference to the accompanying drawings. In the embodiments, the invention is applied to a gun-shaped two-dimensional code reader.

First Embodiment

Figure 1:
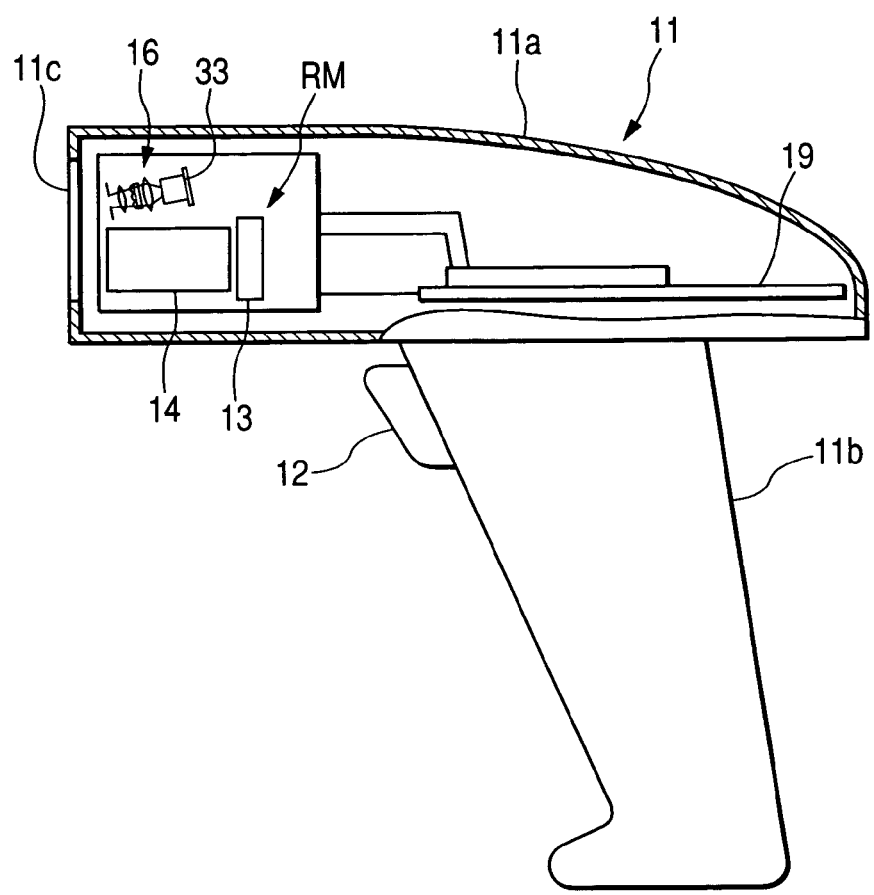
FIG. 1 is a partially cross sectional side view schematically illustrating the structure of a gun-shaped two-dimensional code reader according to a first embodiment of the present invention.
Figure 2:
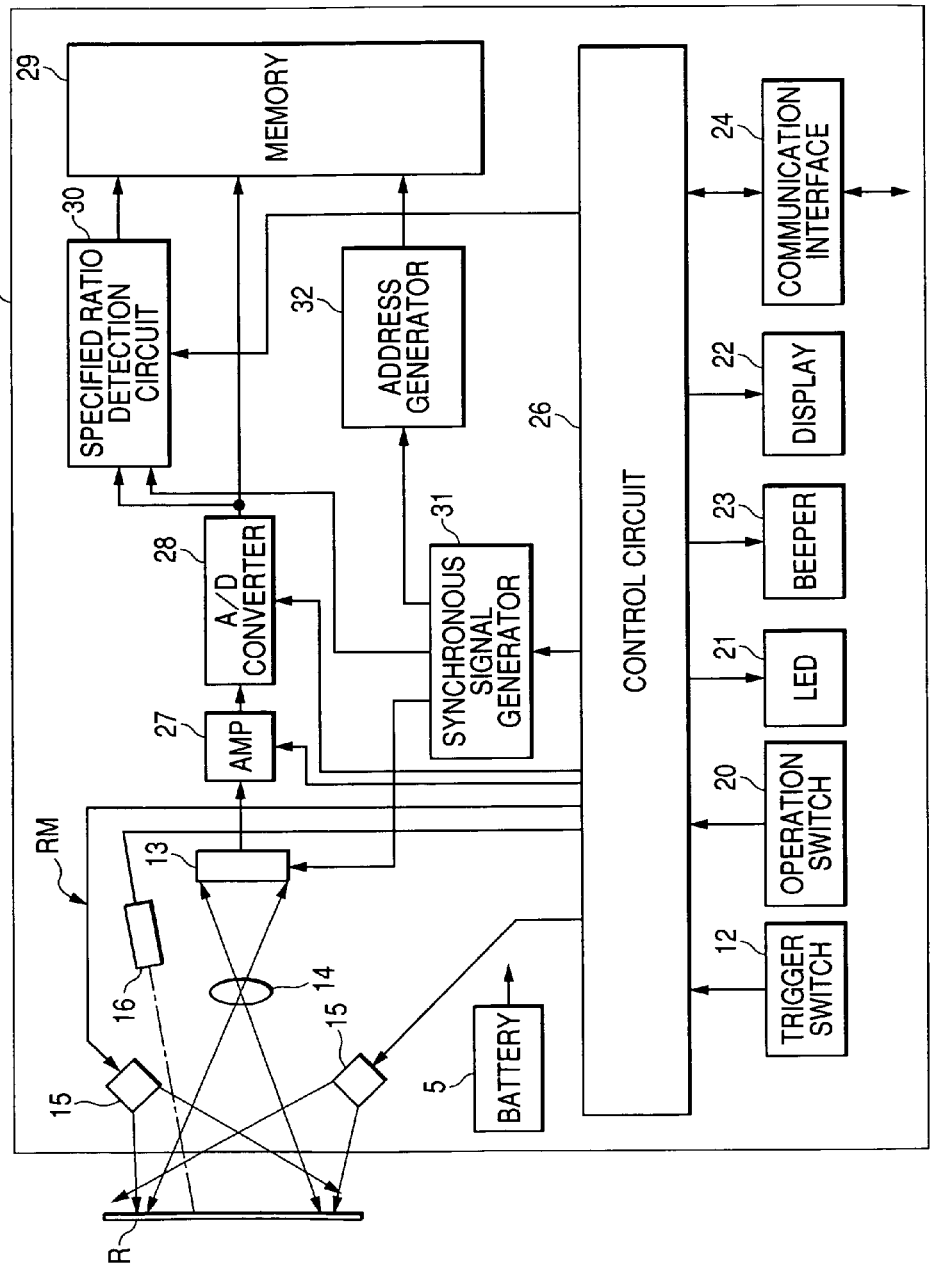
FIG. 2 is a block diagram schematically illustrating the electrical structure of the two-dimensional code reader according to the first embodiment.

FIG. 1 is a partially cross sectional side view schematically illustrating the structure of a gun-shaped two-dimensional code reader CR according to a first embodiment of the present invention; FIG. 2 is a block diagram schematically illustrating the electrical structure of the two-dimensional code reader CR according to the first embodiment.

As shown in FIG. 1, the two-dimensional code reader CR as an example of apparatuses for optically reading a target according to the first embodiment of the present invention is provided with a gun-shaped housing 11. The gun-shaped housing 11 has, for example, a thin rectangular parallelepiped main body 11a. One lateral end portion of the main body 11a is rounded.

The gun-shaped housing 11 is provided at one side (specifically, bottom side in FIG. 1) of the one lateral end portion of the main body 11a with a grip portion 11b extending away from the main body 1a. The grip portion 11b is integrally formed to the main body 11a. The grip portion 11b allows a user to easily grip the two-dimensional code reader CR in one hand and handle it.

The main body 11a is formed at a lateral surface of the other lateral end portion with a reading window 11c having, for example, a rectangular shape and translucency. The two-dimensional code reader CR is also provided with a trigger switch 12. The trigger switch 12 is disposed to one side surface of the grip portion 11b, which is directed to the reading window 11c. The trigger switch 12 permits a user to instruct a reading operation to the two-dimensional code reader CR.

The two-dimensional code reader CR is provided with a reading mechanism (optical reading mechanism) RM disposed in the other lateral end portion of the housing 11. In the first embodiment, the other lateral end portion of the housing 11 is referred to as "head portion".

The reading mechanism RM is operative to read a two-dimensional code, such as a QR (Quick Response) code, attached to a target R (see FIG. 2) by printing or other similar methods. The target R includes a catalog and a label that is a piece of paper or another media. The target R can be attached on goods, which is the same as general barcodes. The two-dimensional code includes information, such as, a manufactures serial number, a name, a unique identification number, a date of manufacture of the goods, and a URL indicating information on the Internet.

In recent years, the target R includes the screen of a display, such as a liquid crystal display (LCD) in a computer terminal, such as a cellular phone or a PDA (Personal Digital Assistant); a two-dimensional code is displayed on the screen of the display.

For example, the two-dimensional code consists of different color cells, such as black or white cells arranged in a matrix to form specific patterns therein, thereby indicating data. One of the black and white colors corresponds to one of bit values "0" and "1", and the other of the black and white colors to the other of bit values "0" and "1". After reading the cells, it is possible to digitize easily the read color data to decode it.

Figure 3:
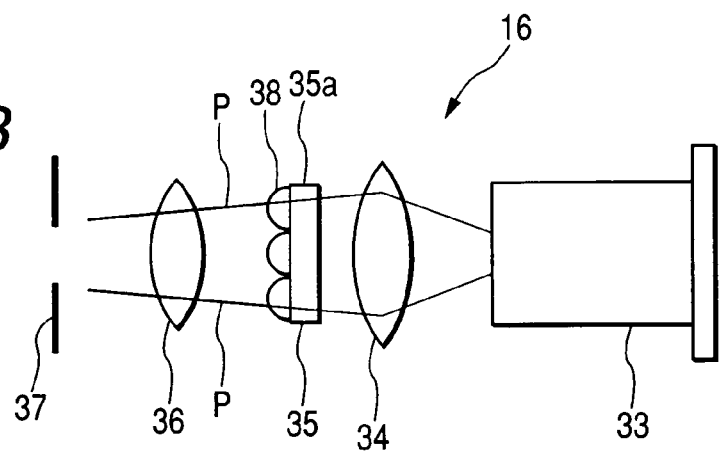
FIG. 3 is a view schematically illustrating the structure of a marker beam irradiating device according to the first embodiment of the present invention.

As schematically illustrated in FIGS. 1 to 3, the reading mechanism RM includes a photodetector 13, an imaging lens 14 constituting an imaging optics, and a plurality of, such as a pair of, light illuminating devices 15; these devices 15 are only illustrated in FIG. 2. The reading mechanism RM also includes a marker beam irradiating device 16 for marking the location of the field of view (FOV) of the photodetector 13 and/or the center of the field of view.

The photodetector 13 is composed of, for example, a CCD area sensor. The photodetector 13 is located at the center of the head portion of the main body 11a. The photodetector 13 has an active area (light sensitive pixel area) composed of pixels arranged horizontally and vertically, for example, in matrix. Specifically, in the first embodiment, the pixel area of the photodetector 13 corresponds to the FOV thereof.

The photodetector 13 also has a predetermined optical axis. The photodetector 13 is arranged so that its pixel area is parallely opposite to the reading window 11c of the main body 11a and its optical axis coaxially aligned with the center of the reading window 11c. The aspect ratio of the field of view of the photodetector 13 is set to, for example, 3:4. The exposure time, that is, the shutter speed of the photodetector 13, can be externally controlled.

The imaging lens 14 has a body tube and a plurality of lens elements that are disposed coaxially therein. The imaging lens 14 has a predetermined optical axis. The imaging lens 14 is arranged so that its optical axis extends orthogonally with the head end surface, which is formed with the reading window 11c, of the main body 11a. That is, the reading window 11c, the photodetector 13 and the imaging lens 14 are coaxially aligned with one another in the main body 11a.

Each of the light illuminating devices 15 is disposed around the imaging lens 14 except for one radial side, specifically top side, thereof. Specifically, each of the light illuminating devices 15 is provided with a light emitting diode (LED) serving as a light source. Each of the light illuminating devices 15 is also provided with a light lens disposed between the corresponding light emitting diode and the reading window 11c. An optical axis of each light lens is directed to the reading window 11c so that each light lens is operative to collect and diffuse light emitted from each light emitting diode through the reading window 11c.

Specifically, when the reading window 11c of the code reader CR is positioned to be opposite to the target R on which the two-dimensional code is attached, illuminating light emitted from each of the light illuminating devices 15 is irradiated through the reading window 11c onto the two-dimensional code. Light reflected from the two-dimensional code is entered through the reading window 11c into the imaging lens 14. The reflected light entered into the imaging lens 14 is focused on the pixel area of the photodetector 13 by the imaging lens 14, so that an image corresponding to the two-dimensional code is picked up by the photodetector 13.

In addition, as shown in FIG. 1, the two-dimensional code reader CR is provided with a circuit board 19 disposed in the main body 11a at its one end side, specifically backside opposite to the head side. In the circuit board 19, electrical components of the code reader CR are installed (see FIG. 2). As illustrated in only FIG. 2, the two-dimensional code reader CR is provided with an operation switch 20, an LED (light emitting device diode) 21, a liquid crystal display 22, a beeper 23, and a communication interface 24. These elements 20 to 24 are disposed to the other side (specifically, top side in FIG. 1) of the one lateral end portion of the main body 11a, respectively.

The operation switch 20 allows a user to input various instructions to the code reader CR. The LED 21 is operative to visually indicate information to send notice to a user. The beeper 23 is operative to emit a series of beeps to send notice to a user. The communication interface 24 allows the code reader CR to communicate with external devices.

Moreover, the two-dimensional code reader CR is provided with a battery 25 as a power supply for activating the above optical devices 13, 15, 16, the electrical components installed in the circuit board 19, and the above I/O devices 12, 20-24, respectively.

As shown in FIG. 2, in the circuit board 19, a control circuit 26 composed of, for example, at least one microcomputer {a CPU (Central Processing Unit), an internal memory unit including a ROM (Read Only Memory), a RAM (Random Access Memory) and the like, and peripherals} is provided. Note that the control circuit can be designed to a hard-wired logic circuit.

The control circuit 26 operates based on power supplied from the battery 25. The control circuit 26 operates in accordance with programs stored in, for example, the ROM and/or RAM to control the whole of the two-dimensional code reader CR and to perform decoding processes and other processes. The programs can be loaded from a signal bearing media to the internal memory unit. Examples of suitable signal bearing media include recordable type media such as floppy disks and CD (Compact Disk)-ROM, and transmission type media such as digital and analog communications links.

The control circuit 26 is communicably coupled to the trigger switch 12 and the operation switch 20, so that the commands sent from the switches 12 and 20 are inputted to the control circuit 26. The control circuit 26 is communicably coupled to the photodetector 13, the light illuminating devices 15, and the marker beam irradiating device 16, respectively.

That is, the control circuit 26 operates to control the photodetector 13, the light illuminating devices 15, and the marker beam irradiating device 16 to execute reading processes of the two-dimensional code attached to the target R. The control circuit 26 is also communicably coupled to the LED 21, the beeper 23, and the liquid crystal display 22 to control them. Moreover, the control circuit 26 is communicably coupled to the communication interface 24 to communicate with external devices including, for example, a management computer, through the communication interface 24.

Specifically, the control circuit 26 is operative to control the exposure time (the shutter speed) of the photodetector 13.

Furthermore, in the circuit board 19, an amplifier (AMP) 17, an analog to digital (A/D) converter 28, a memory 29, a specified-ratio detection circuit 30, a synchronous signal generator 31, and an address generator 32 are installed so that they are communicably coupled to the control circuit 26, respectively.

The amplifier 27 is electrically connected to the photodetector 13 and operative to amplify an image signal outputted from the photodetector 13 at a gain based on a gain control signal transmitted from the control circuit 26. The A/D converter 28 is electrically connected to the amplifier 27 and operative to convert the amplified image signal into digital image data eight intensity data (pixel data) of each pixel of the light sensitive pixel area of the photodetector 13).

The synchronous signal generator 31, for example, periodically generates a synchronous signal to periodically output it to the photodetector 13, the specified ratio detection circuit 30, and the address generator 32 under the control of the control circuit 26.

The address generator 32 periodically counts a number of the transmitted synchronous signals to generate address signals in response to the count result, thereby outputting the address signals to the memory 29.

Specifically, the image data sent from the A/D converter 28 is stored in the memory 29 so as to correspond to the outputted address signals. The specified-ratio detection circuit 30 is operative to detect specified patterns (bit patterns) in the image data in response to the synchronous signals based on the control of the control circuit 26. The control circuit 26 and the specified-ratio detection circuit 30 identify the type of information code corresponding to the image data based on the detected specified patterns, thereby decoding the image data based on the identified result. That is, the specified patterns in the image data allow the control circuit 26 and the specified-ratio detection circuit 30 to identify the type of the image data (information code).

Next, the structure of the marker beam irradiating device 16 will be described hereinafter with reference to FIGS. 3 to 5.

The marker beam irradiating device 16 is disposed around the reading mechanism RM. For example, the marker beam irradiating device 16 is disposed to the one radial side (top side) of the imaging lens 14 so that each of the light illuminating devices 15 and the marker beam irradiating device 16 are positionally free from each other.

The marker beam irradiating device 16 is operative to irradiate a marker beam M with a predetermined beam pattern for indicating a photodetector's reading position, such as the FOV of the photodetector 13 on the target R. FIG. 5 illustrates the pattern shape of the predetermined marker beam pattern on the target R.

Figure 5:
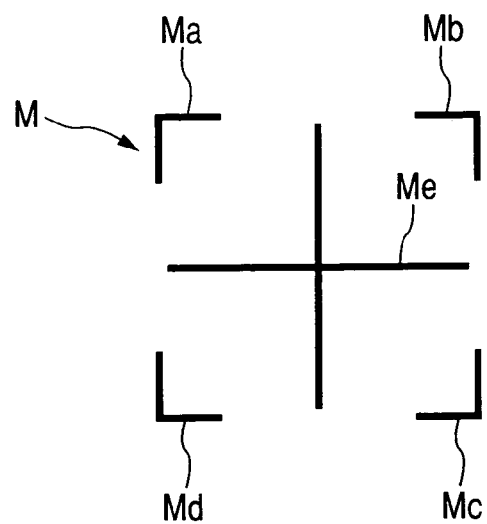
FIG. 5 is a view schematically illustrating the pattern shape of a predetermined marker beam pattern on a target, which is formed by the marker beam irradiating device shown in FIG. 3.

As illustrated in FIG. 5, the predetermined beam pattern of the marker beam M is composed of four L-shaped pattern elements (beamlets) Ma to Md corresponding to the four corner portions of the photodetector's FOV whose aspect ratio is set to 3:4. In addition, the predetermined beam pattern of the marker beam M is also composed of a cross pattern element Me indicating the center of the FOV. Specifically, each of the L-shaped pattern elements (beamlets) Ma to Md and the cross pattern element has a predetermined pattern width (beam width).

As illustrated in FIG. 3, the marker beam irradiating device 16 is provided with a laser diode 33 as a light source, which is directed such that the optical axis thereof passes through the reading window 11c. The marker beam irradiating device 16 is also provided with a collective lens 34, a pattern forming lens 35, an imaging lens 36, and a lens aperture 37, which are coaxially aligned at the laser-beam output side (reading window side) of the laser diode 33 in this order with predetermined intervals.

Specifically, the laser diode 33 is operative to emit a diffused laser beam in the visible range of frequencies, such as a red laser beam toward the collective lens 34. The collective lens 34 is operative to collect the emitted diffused laser beam, and to allow the collected beam to enter into the pattern forming lens 35.

The pattern forming lens 35 is made of, for example, transparent plastic, transparent glass, or other transparent material, and operative to form the predetermined pattern of the marker beam M.

Figure 4A:
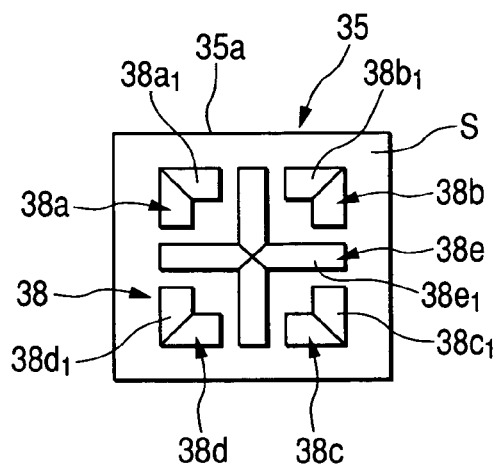
FIG. 4A is a plan view schematically illustrating the structure of a pattern forming lens of the marker beam irradiating device shown in FIG. 3.

Specifically, as illustrated in FIG. 4A, the pattern forming lens 35 is composed of a base element 35a with a horizontally long plate-like shape; this shape corresponds to the area of the photodetector's FOV. The base element 35a is coaxially aligned with the collective lens 34. The pattern forming lens 35 is also provided with a cylindrical lens assembly 38 composed of a plurality of cylindrical lens elements 38a to 38e. The cylindrical lens assembly 38 is integrated with one surface S of the base element 35a; this one surface S faces the imaging lens 36.

Figure 4B:
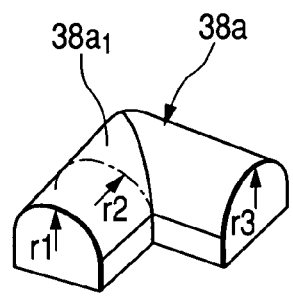
FIG. 4B is a perspective view schematically illustrating part of the pattern forming lens shown in FIG. 4A.
Figure 4C:
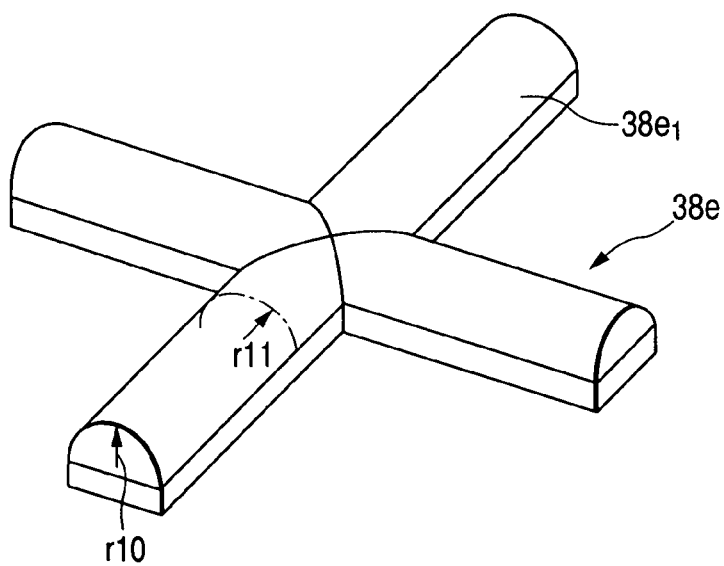
FIG. 4C is a perspective view schematically illustrating part of the pattern forming lens shown in FIG. 4A.

As illustrated in FIGS. 4A to 4C, the number of cylindrical lens elements 38a to 38e corresponds to that of the beam pattern elements Ma to Me, and the shape and orientation of each of the cylindrical lens elements 38a to 38e corresponds to those of each of the beam pattern elements Ma to Me. In addition, the cylindrical lens elements 38a to 38e are arranged on the surface S of the base element 35a to correspond to the arrangement of the beam pattern elements Ma to Me.

Specifically, each of the cylindrical lens elements 38a to 38d has a substantially L-shape. The cylindrical lens element 38a has a substantially cylindrical (semicircle) refractive surface 38a1 with a substantially continuous L-shape, when viewing it from the imaging lens side. Similarly, the cylindrical lens elements 38b to 38d have substantially cylindrical refractive surfaces 38b1 to 38d1 with substantially continuous L-shapes, when viewing them from the imaging lens side, respectively.

As illustrated in FIG. 4C, the cylindrical lens element 38e has a substantially cross-shape. Specifically, the cylindrical lens element 38e has a substantially cylindrical (semicircle) refractive surface 38e1 with a substantially continuous cross-shape, when viewing it from the imaging lens side.

That is, a cylindrical refractive surface of a cylindrical lens has a common function of, when a laser beam is incident into the cylindrical lens, causing the incident laser beam to be refracted, thereby linearly focusing the incident laser beam.

When the laser beam is entered into the L-shaped cylindrical lens elements 38a to 38d of the cylindrical lens assembly 38, therefore, the beamlet incident into the L-shaped cylindrical lens element 38a is refracted by the refractive surface 38a1 thereof. The refracted beamlet having a shape and beam width corresponding to those of the L-shaped pattern element Ma is transferred to be incident into the imaging lens 36.

Similarly, the beamlets incident into the L-shaped cylindrical lens elements 38b to 38d are refracted by the refractive surfaces 38b1 to 38d1 thereof so that the refracted beamlets each having a shape and beam width corresponding to those of each of the L-shaped pattern elements Mb to Md are transferred to be incident into the imaging lens 36.

In addition, when the laser beam is entered into the cross-shaped cylindrical lens element 38e of the cylindrical lens assembly 38, the beamlet incident into the cross-shaped cylindrical lens element 38e is refracted by the refractive surface 38e thereof. The refracted beamlet having a shape and beam width corresponding to those of the cross pattern element Me is transferred to be incident into the imaging lens 36.

In the structure of the first embodiment, as illustrated in the L-shaped cylindrical lens element 38a as a representation of the L-shaped cylindrical lens elements 38a to 38d in FIG. 4B, the cylindrical lens element 38a is configured such that the radius of curvature at each position on the refractive surface 38a1 thereof is changed depending on the distance between each position on the refractive surface 38a1 and the laser beam emitting position of the laser diode 33.

For example, reference character "r" is referred to the radius of curvature of the refractive surface 38a1 of the L-shaped cylindrical lens element 38a. When the radius "r" of curvature at the periphery of one end of the L-shaped refractive surface 38a1 is set to "r1", the farther a position on the refractive surface 38a1 is from the one end toward the corner portion of the L-shaped cylindrical lens element 38, the longer the radius (r2) of curvature at the position on the refractive surface 38a1 is.

Similarly, when the radius "r" of curvature at the peripheral of the other end of the L-shaped refractive surface 38a1 is set to "r3", the farther a position on the refractive surface 38a1 is from the other end toward the corner portion of the L-shaped cylindrical lens element 38a, the longer the radius r2 of curvature at the position on the refractive surface 38a1 is.

That is, in the first embodiment, the longer the radius of curvature at a position on the refractive surface 38a1 is, the smaller the refraction angle of the position on the refractive surface 38a1 is. Adjustment of the radius of curvature at each position on the refractive surface 38a1 therefore allows the refraction angle thereat to be controlled, making it possible to keep constant the beam width of the L-shaped beamlet transferred through the L-shaped cylindrical lens element 38a.

The radius of curvature at each position on each of the refractive surfaces 38b1 to 38d1 of each of the L-shaped cylindrical lens elements 38b to 38d has been adjusted in the same manner as the L-shaped cylindrical lens element 38a. This makes it possible to keep constant the beam width of the L-shaped beamlet transferred through each of the L-shaped cylindrical lens elements 38b to 38d.

Similarly, reference character "ra" is referred to the radius of curvature of the refractive surface 38e1 of the cross-shaped cylindrical lens element 38e. When the radius "ra" of curvature at the periphery of one end of the refractive surface 38e1 is set to "r10", the farther a position on the refractive surface 38e1 is from the one end toward the corner portion of the center portion of the lens element 38e, the longer the radius, referred to as "r11", of curvature at the position on the refractive surface 38e1 is.

That is, in the first embodiment, the longer the radius of curvature at a position on the refractive surface 38e1 is, the smaller the refraction angle of the position on the refractive surface 38e1 is. Adjustment of the radius of curvature at each position on the refractive surface 38e1 therefore allows the refraction angle thereat to be controlled, making it possible to keep constant the beam width of the cross-shaped beamlet transferred through the cross-shaped cylindrical lens element 38e.

In addition, the laser diode 33 is arranged such that the distance between the laser beam emitting position of the laser diode 33 and each principal point of each of the cylindrical lens elements 38a to 38e exceeds the focal length of each of the cylindrical lens elements 38a to 38e.

In addition, the imaging lens 36 is operative to form an image on the target R based on the marker beam M through the lens aperture 37. In the first embodiment, as illustrated in FIG. 1, the collective lens 34 is configured and arranged to collect the laser beam emitted from the laser diode 33 such that the marker beam M transferred through cylindrical lens assembly 38 corresponds to the entrance pupil (pupil axes P) of the imaging lens 36.

In addition, the lens aperture 37 is operative to eliminate diffusive light when the target R is comparatively far from the reading window 11c.

In the first embodiment, the control circuit 26 is operative to control the laser diode 33 of the marker beam irradiating device 16 such that the laser diode 33 continuously or periodically emits the laser beam while the two-dimensional code reader CR is running.

In addition, it is assumed that the trigger switch 12 is designed to allow a user to push it in two strokes (first and second strokes). In this assumption, in order to irradiate the marker beam M on the target R, a user pushes the trigger switch in the first stroke, such as in half stroke. The command corresponding to the half stroke of the trigger switch 12 and representing to irradiate the marker beam M is sent to the control circuit 26, so that the control circuit 26 is operative to control the laser diode 33 to emit the laser beam.

Next, operations of the two-dimensional code reader CR according to the first embodiment will be described hereinafter.

When a user wants to read the two-dimensional code attached to the target R, the user locates the power-on state code reader CR at a position so that the reading window 11c is opposite to the target R and away therefrom at an arbitrary distance.

While the code reader CR is arranged in such a state, because the laser beam is continuously emitted from the laser diode 33 of the marker beam irradiating device 16, so that the marker beam M is continuously irradiated on the target R from the marker beam irradiating device 16 (see FIG. 5). The marker beam M indicates the reading position (FOV) of the photodetector 13.

Next, the user aligns the code reader CR with the target R to locate it to a position where the two-dimensional code is located at the center of the irradiated marker beam M (FOV). While the marker beam M is being irradiated on the target R, the user operates the trigger switch 12 to turn it on.

In response to the turning on of the trigger switch 12, the control circuit 26 controls the laser diode 33 to temporarily interrupt the irradiation of the marker beam M, and turns on each of the light illuminating devices 15.

As a result, illuminating light emitted from each of the light illuminating devices 15 is irradiated through the reading window 11c onto the two-dimensional code on the target R. Light reflected from the two-dimensional code of the target R is entered through the reading window 11c into the imaging lens 14. The reflected light entered into the imaging lens 14 is focused on the pixel area of the photodetector 13 by the imaging lens 14, so that an image corresponding to the two-dimensional code is picked up by the photodetector 13.

The marker beam irradiating device 16 according to the first embodiment, as set forth above, forms the predetermined beam pattern of the marker beam M (beam pattern elements Ma to Me) based on the cylindrical lens assembly 38 having the cylindrical lens elements 38a to 38e. The shape and orientation of each of the cylindrical lens elements 38a to 38e correspond to those of each of the beam pattern elements Ma to Me, and the cylindrical lens elements 38a to 38e are arranged to correspond to the arrangement of the beam pattern elements Ma to Me, respectively.

These cylindrical lens elements 38a to 38e therefore allow linear beamlets, which correspond to the beam pattern elements Ma to Me, to be formed therethrough. This allows the beam pattern elements Ma to Me to be clearly irradiated on the target R.

In addition, in the first embodiment, it is possible to change the radius of curvature at each position on each of the refractive surfaces 38a1 to 38e1 of the cylindrical lens elements 38a to 38e depending on the distance between each position on each of the refractive surfaces 38a1 to 38e1 and laser beam emitting position of the laser diode 33. This allows the beam width of each of the beam pattern elements composed of the marker beam M to be maintained constant. This enables the clear irradiation of the beam pattern elements Ma to Me on the target R to be stable.

Moreover, in the first embodiment, even if the target R is comparatively far from the reading window 11c, the lens aperture 37 eliminates diffusive light, making it possible to further improve the clearness of the beam pattern irradiated on the target R. In addition, the collective lens 34 is configured and arranged to collect the laser beam emitted from the laser diode 33 such that the marker beam M transferred through the imaging lens 36 corresponds to the entrance pupil (pupil axes P) of the imaging lens 36. This configuration of the collective lens 34 allows a loss of the laser beam to decrease, keeping the brightness of marker beam M to be high.

As described above, in the first embodiment of the present invention, the two-dimensional code reader CR is provided with the cylindrical lens assembly 38 composed of the cylindrical lens elements 38a to 38e; these cylindrical lens elements 38a to 38e allow linear beamlets, which correspond to the beam pattern elements Ma to Me, to be formed therethrough. In the structure, it is possible to irradiate the marker beam M with predetermined beam patterns based on the linear beamlets and the combination thereof, which is different from forming beam patterns of a marker beam using dot-patterns based on the hologram plane of the conventional diffraction grating 6.

Note that changing the arrangement of the cylindrical lens elements, the number of the cylindrical lens elements, the shapes and orientations thereof allow desirable beam patterns of the marker beam to be easily designed.

Second Embodiment

Figure 6:
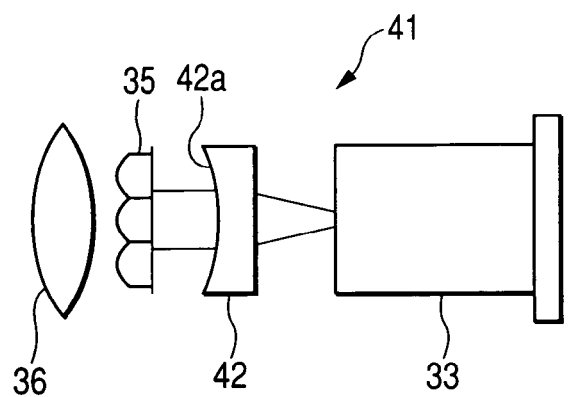
FIG. 6 is a view schematically illustrating the structure of a marker beam irradiating device according to a second embodiment of the present invention.
Figure 7:
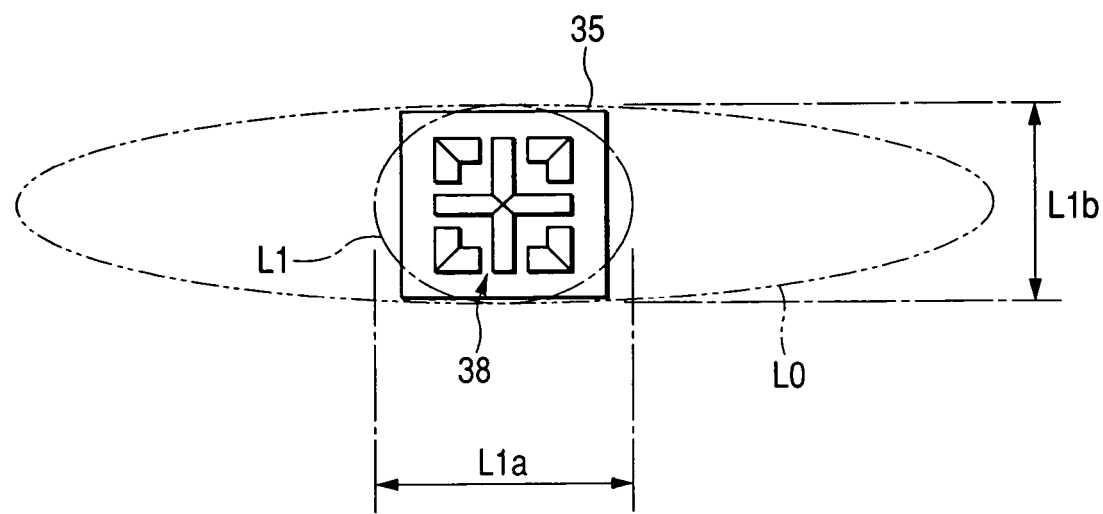
FIG. 7 is a view schematically illustrating a relationship between the configuration of the pattern forming lens and beam profiles of a laser beam according to the second embodiment of the present invention.

FIGS. 6 and 7 illustrate a second embodiment of the present invention. Explanations of the elements of a second embodiment's two-dimensional code reader, except for a marker beam irradiating device according to the second embodiment, which are substantially identical with those of the code reader CR according to the first embodiment, are omitted or simplified. That is, explanations are focused on the structure of the marker beam irradiating device according to the second embodiment.

In the second embodiment, a different point of the marker beam irradiating device 41 from the marker beam irradiating device 16 of the first embodiment is that the collective lens 34 is replaced with a collective lens 42.

Specifically, the collective lens 42 has an output surface 42a concavely curved. The collective lens 42 is operative to collect the emitted diffused laser beam in a substantially circular profile (a substantially ellipsoid profile) in its lateral cross section. The collective lens 42 is also operative to allow the collected beam to enter into the pattern forming lens 35. The incident beam into the pattern forming lens 35 is represented as reference character "L1" in FIG. 7.

To describe the structure of the collective lens 42 it in detail, the output surface 42a has a predetermined horizontal curvature in the horizontal direction corresponding to the horizontal direction of the photodetector 13, and a predetermined vertical curvature in the vertical direction corresponding to the vertical direction of the photodetector 13. The horizontal curvature and the vertical curvature of the output surface 42a of the collective lens 42 are set such that the ratio of length of the beam profile L1 in the major axis (in the horizontal direction) to that thereof in the minor axis (the vertical direction) is substantially equal to the aspect ratio of the photodetector's FOV of 3:4.

In a case where the collimate lens 5 described above is used in place of the collective lens 42, as illustrated in FIG. 7 by the chain double-dot line L0, a laser beam collected by the collimate lens 5 has a substantially horizontally prolate ellipsoid profile in its lateral cross section. This may cause loss of the amount of laser beam incident to the pattern forming lens 35 to comparatively increase, and the amount of brightness of the marker beam M may be insufficient.

In the structure of the second embodiment, however, the beam profile L1 of the collected laser beam in its lateral cross section is more focused as compared with the beam profile L0 in a case of using the collimator lens. The collective lens 42, therefore, allows the efficiency of collecting the laser beam emitted from the laser diode 33 to increase, making it possible to clearly irradiate the marker beam M with high brightness on the target R.

Especially, in the second embodiment, the ratio of length of the beam profile L1 in the major axis (in the horizontal direction) to that thereof in the minor axis (the vertical direction) is substantially equal to the ratio of the aspect ratio of the photodetector's FOV of, such as, 3:4. This allows the efficiency of collecting the laser beam emitted from the laser diode 33 to further increase.

Third Embodiment

FIG. 8A illustrates a third embodiment of the present invention. Explanations of the elements of a third embodiment's two-dimensional code reader, except for a marker beam irradiating device according to the third embodiment, which are substantially identical with those of the code reader CR according to the first embodiment, are omitted or simplified. That is, explanations are focused on the structure of the marker beam irradiating device according to the third embodiment.

In the third embodiment, as illustrated in FIG. 8B, the predetermined beam pattern of a marker beam M1 according to the third embodiment is composed of a center pattern element M1a corresponding to the center position of the photodetector's FOV. In addition, the predetermined beam pattern of the marker beam M1 is also composed of a pair of linear pattern elements M1b and M1d vertically surrounding the center pattern element M1a to emphatically indicate the center pattern element M1a. Moreover, the predetermined beam pattern of the marker beam M1 is also composed of a pair of linear pattern elements M1c and M1e horizontally surrounding the center pattern element M1a to emphatically indicate the center pattern element M1a. Specifically, each of the pattern elements (beamlets) M1b to M1e has a predetermined pattern width (beam width).

A different point of the marker beam irradiating device from the marker beam irradiating device 16 according to the first embodiment is that the pattern forming lens 35 is replaced with a pattern forming lens 51.

The pattern forming lens 51 is made of, for example, transparent plastic, transparent glass, or other transparent material, and operative to form the predetermined pattern of the marker beam M1.

Specifically, as illustrated in FIG. 8A, the pattern forming lens 51 is composed of a base element 51a with a horizontally long plate-like shape; this shape corresponds to the area of the photodetector's FOV. The base element 51a is coaxially aligned with the collective lens 34. The pattern forming lens 51, is also provided with a cylindrical lens assembly 52 composed of a plurality of cylindrical lens elements 52a to 52e. The cylindrical lens assembly 52 is integrated with one surface S1 of the base element 51a; this one surface S1 faces the imaging lens 36.

As illustrated in FIG. 8A, the shape and orientation of each of the cylindrical lens elements 52a to 52e corresponds to those of each of the pattern elements M1a to M1e, and the arrangement of the cylindrical lens elements 52a to 52e corresponds to the arrangement of the pattern elements M1a to M1e.

Specifically, the cylindrical lens element 52a has a substantially hemispherical shape located at the center of the one surface S1 of the base element 51a. The cylindrical lens elements 52b to 52e are arranged on the one surface S1 of the base element 51a to surround the cylindrical lens element 52a. The cylindrical lens elements 52b and 52d are arranged to extend along the vertical direction, and the cylindrical lens elements 52c and 52e are arranged to extend along the horizontal direction.

The cylindrical lens element 52a has a substantially hemispherical refractive surface 52a1. Similarly, the cylindrical lens elements 52b to 52e have substantially cylindrical refractive surfaces 52b1 to 52e1.

Similar to the first embodiment, when the laser beam is entered into the cylindrical lens elements 52a to 52e of the cylindrical lens assembly 52, the beamlet incident into the cylindrical lens element 52a is refracted by the refractive surface 52a1 thereof. The refracted beamlet by the cylindrical lens element 52a has a shape and beam diameter corresponding to those of the pattern element M1a.

Similarly, the beamlets incident into the cylindrical lens elements 52b to 52e are refracted by the refractive surfaces 52b1 to 52e1 thereof so that the refracted beamlets each has a shape and beam width corresponding to those of each of the pattern elements M1b to M1e.

In the structure of the third embodiment, like the first embodiment, each of the cylindrical lens elements 52b to 52e is configured such that the radius of curvature at each position on each of the refractive surfaces 52b1 to 52e1 thereof is changed depending on the distance between each position on each of the refractive surfaces 52b1 to 52e1 and the laser beam emitting position of the laser diode 33.

The marker beam irradiating device according to the third embodiment, as set forth above, forms the predetermined beam pattern of the marker beam M1 (beam pattern elements M1a to M1e) based on the cylindrical lens assembly 51 having the cylindrical lens elements 52a to 52e. The shape and orientation of each of the cylindrical lens elements 52a to 52e correspond to those of each of the pattern elements M1a to M1e, and the cylindrical lens elements 52a to 52e are arranged to correspond to the arrangement of the beam pattern elements M1b to M1e.

These cylindrical lens elements 52a to 52e therefore allow linear beamlets, which correspond to the beam pattern elements M1a to M1e to be formed therethrough, respectively. This allows the beam pattern elements M1a to M1e to be clearly irradiated on the target R. In addition, in the third embodiment, it is possible to form the marker beam M1 so as to emphasize the center position of the reading position (FOV).

Fourth Embodiment

FIG. 9A illustrates a fourth embodiment of the present invention. Explanations of the elements of a fourth embodiment's two-dimensional code reader, except for a marker beam irradiating device according to the fourth embodiment, which are substantially identical with those of the code reader CR according to the fourth embodiment, are omitted or simplified. That is, explanations are focused on the structure of the marker beam irradiating device according to the fourth embodiment.

In the fourth embodiment, as illustrated in FIG. 9B, the predetermined beam pattern of a marker beam M2 according to the fourth embodiment is composed of a horizontal line pattern element M2a corresponding to the horizontal line of the photodetector's FOV passing through the center of the FOV. In addition, the predetermined beam pattern of the marker beam M2 is also composed of a pair of linear pattern elements M2b and M2c vertically orthogonally surrounding the center portion of the horizontal line pattern element M2a with predetermined intervals to emphatically indicate the center pattern element M2a. The pattern width of the horizontal line pattern element M2a is substantially equal to that of each of the linear pattern elements M2b and M2c.

A different point of the marker beam irradiating device from the marker beam irradiating device 16 according to the first embodiment is that the pattern forming lens 35 is replaced with a pattern forming lens 61.

The pattern forming lens 61 is made of, for example, transparent plastic, transparent glass, or other transparent material, and operative to form the predetermined pattern of the marker beam M2.

Specifically, as illustrated in FIG. 9A, the pattern forming lens 61 is composed of a base element 61a with a horizontally long plate-like shape; this shape corresponds to the area of the photodetector's FOV. The base element 61a is coaxially aligned with the collective lens 34. The pattern forming lens 61 is also provided with a cylindrical lens assembly 62 composed of a plurality of cylindrical lens elements 62a to 62c. The cylindrical lens assembly 62 is integrated with one surface S2 of the base element 61a; this one surface S2 faces the imaging lens 36.

As illustrated in FIG. 9A, the shape and orientation of each of the cylindrical lens elements 62a to 62c corresponds to those of each of the pattern elements M2a to M2c, and the arrangement of the cylindrical lens elements 62a to 62c corresponds to the arrangement of the pattern elements M2a to M2c.

Specifically, the cylindrical lens element 62a has a substantially horizontal linear shape located to pass the center of the one surface S2 of the base element 61a. The cylindrical lens elements 62b and 62c are arranged on the one surface S2 of the base element 61a to surround the center portion of the cylindrical lens element 62a. The cylindrical lens elements 62b and 62c are arranged to extend along the vertical direction.

The cylindrical lens element 62a has a substantially cylindrical refractive surface 62a1. Similarly, the cylindrical lens elements 62b and 62c have substantially cylindrical refractive surfaces 62b1 and 62c1.

As well as the first embodiment, when the laser beam is entered into the cylindrical lens elements 62a to 62c of the cylindrical lens assembly 62, the beamlet incident into the cylindrical lens element 62a is refracted by the refractive surface 62a1 thereof. The refracted beamlet by the cylindrical lens element 62a has a shape and beam width corresponding to those of the pattern element M2a.

Similarly, the beamlets incident into the cylindrical lens elements 62b and 62c are refracted by the refractive surfaces 62b1 and 62c1 thereof so that the refracted beamlets each having has a shape and beam width corresponding to those of each of the pattern elements M2b and M2c.

In the structure of the fourth embodiment, like the first embodiment, each of the cylindrical lens elements 62a to 62c is configured such that the radius of curvature at each position on each of the refractive surfaces 62a1 to 62c1 thereof is changed depending on the distance between each position on each of the refractive surfaces 62a1 to 62c1 and the laser beam emitting position of the laser diode 33.

The marker beam irradiating device according to the fourth embodiment, as set forth above, forms the predetermined beam pattern of the marker beam M2 (beam pattern elements M2a to M2c) based on the cylindrical lens assembly 61 having the cylindrical lens elements 62a to 62c. The shape and orientation of each of the cylindrical lens elements 62a to 62c correspond to those of each of the pattern elements M2a to M2c, and the cylindrical lens elements 62a to 62c are arranged to correspond to the arrangement of the beam pattern elements M2a to M2c.

These cylindrical lens elements 62a to 62c therefore allow linear beamlets, which correspond to the beam pattern elements M2a to M2c to be formed therethrough, respectively. This allows the beam pattern elements M2a to M2c to be clearly irradiated on the target R. In addition, in the fourth embodiment, it is possible to form the marker beam M2 so as to emphasize the center position of the reading position (FOV).

In addition, in the fourth embodiment, the cylindrical lens element 62a allows the horizontal beam pattern M2a to be irradiated on the target R. When reading out a one-dimensional code, such as a barcode, therefore, it is possible to use the marker beam M2 as the irradiating light onto the barcode.

Fifth Embodiment

FIGS. 10 to 13B illustrate a fifth embodiment of the present invention. Explanations of the elements of a fifth embodiment's two-dimensional code reader, except for a marker beam irradiating device according to the fifth embodiment, which are substantially identical with those of the code reader CR according to the first embodiment, are omitted or simplified. That is, explanations are focused on the structure of the marker beam irradiating device according to the fifth embodiment.

Figure 10:
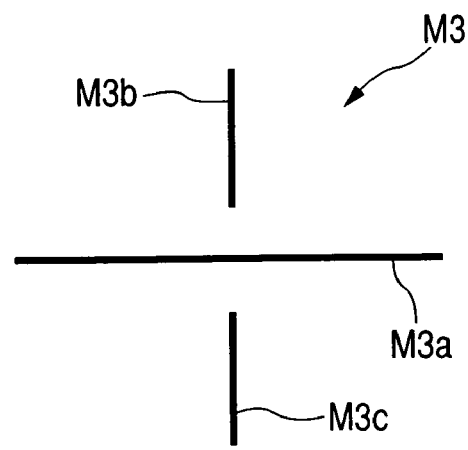
FIG. 10 is a view schematically illustrating the pattern shape of a predetermined marker beam pattern on a target, which is formed by a marker beam irradiating device according to a fifth embodiment of the present invention.

In the fifth embodiment, as illustrated in FIG. 10, the predetermined beam pattern of a marker beam M3 according to the fifth embodiment is composed of a horizontal line pattern element M3a corresponding to the horizontal line of the photodetector's FOV passing through the center of the FOV. In addition, the predetermined beam pattern of the marker beam M3 is also composed of a pair of linear pattern elements M3b and M3c vertically orthogonally surrounding the center portion of the horizontal line pattern element M3a with predetermined intervals to emphatically indicate the center pattern element M3a. The pattern width of the horizontal line pattern element M3a is substantially equal to that of each of the linear pattern elements M3b and M3c.

A different point of the marker beam irradiating device from the marker beam irradiating device 16 according to the first embodiment is that the pattern forming lens 35 is replaced with a pattern forming lens 81.

The pattern forming lens 81 is made of, for example, transparent plastic, transparent glass, or other transparent material, and operative to form the predetermined pattern of the marker beam M3.

Specifically, as illustrated in FIGS. 11, and 12A to 12D, the pattern forming lens 81 is composed of a base element 81a with a horizontally long plate-like shape. The base element 81a is coaxially aligned with the collective lens 34. The pattern forming lens 81 is also provided with a first lens portion 82 and a pair of second lens portions 83, 83 integrated with one surface S3a of the base element 81a; this one surface S3a faces the imaging lens 36 to serve as an output surface of the pattern forming lens 81.

Figure 11:
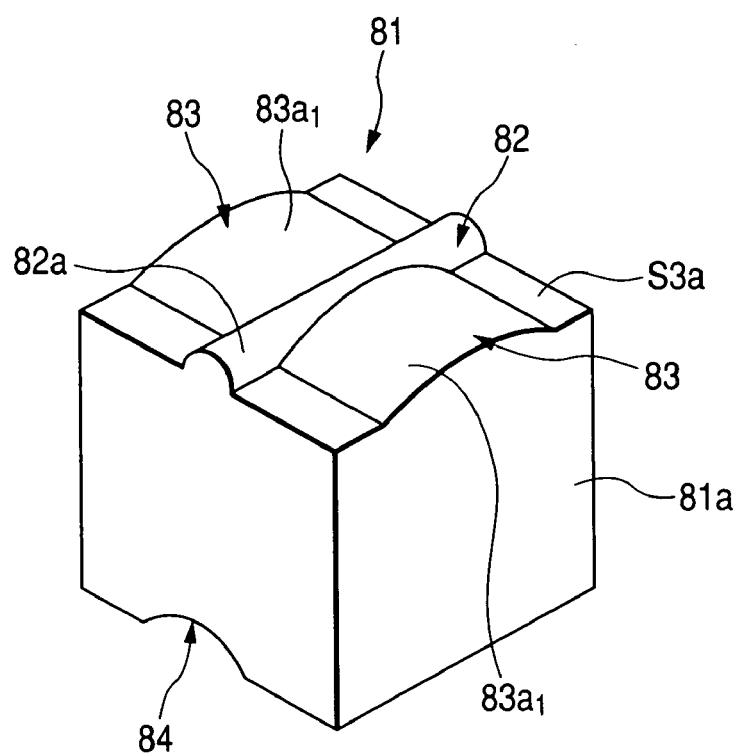
FIG. 11 is a perspective view schematically illustrating the structure of a pattern forming lens of a marker beam irradiating device according to the fifth embodiment of the present invention.
Figure 12A:
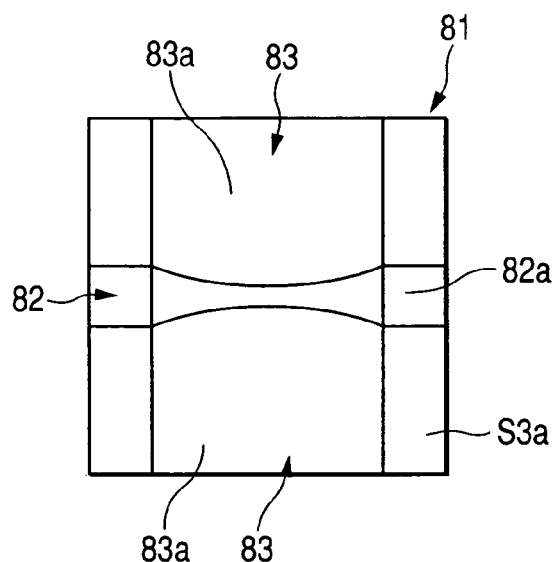
FIG. 12A is a view schematically illustrating first and second lens portions formed on an output surface of the pattern forming lens illustrated in FIG. 11.

As illustrated in FIGS. 11 and 12A, the first lens portion 82 is convexly formed on the one surface S3a to have a substantially half cylindrical refractive surface 82a in its lateral cross section. The refractive surface 82a extends horizontally entirely to pass through the center of the one surface S3a with a comparatively narrow width.

The second lens portions 83, 83 are convexly formed on the one surface S3a to have curved cylindrical refractive surfaces 83a, 83a, respectively, such that each of the second lens portions 83, 83 extends vertically with a predetermined horizontal beam width, which is wider than the width of the first lens portion 82.

Figure 12B:
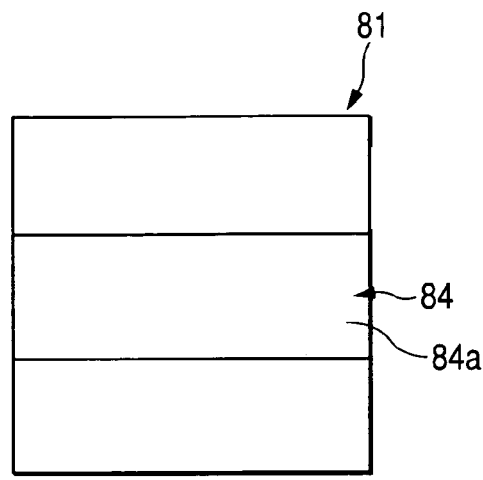
FIG. 12B is a view schematically illustrating a third lens portion formed on an entrance surface of the pattern forming lens illustrated in FIG. 11.
Figure 12C:
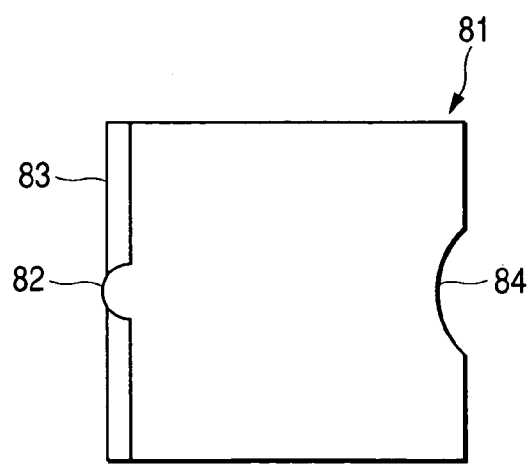
FIG. 12C is a view schematically illustrating one side of the pattern forming lens illustrated in FIG. 11, when viewing it along a horizontal direction according to the fifth embodiment.
Figure 12D:
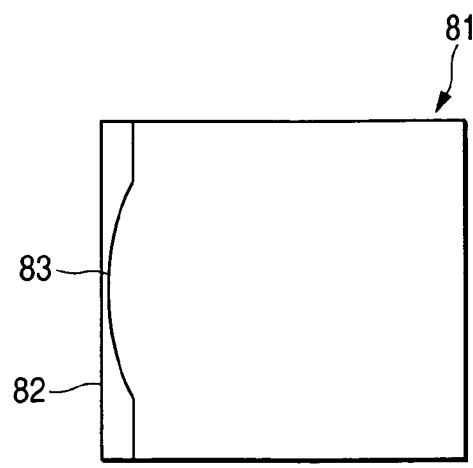
FIG. 12D is a view schematically illustrating another side of the pattern forming lens illustrated in FIG. 11, when viewing it along a vertical direction according to the fifth embodiment.

As illustrated in FIGS. 12C and 12D, the first lens portion 82 has a predetermined curvature larger than that of each of the second lens portions 83, 83, in other words, the radius of curvature of the refractive surface 82a of the first lens portion 82 is shorter than that of curvature of each of the refractive surfaces 83a. In addition, the projecting length of the refractive surface 82a of the first lens portion 82 is longer than that of each of the refractive surfaces 83a of the second lens portions 83.

Furthermore, the pattern forming lens 81 is provided with a third lens portion 84 integrated with the other surface S3b of the base element 81a; this other surface S3b faces the collective surface 34 to serve as an entrance surface of the pattern forming lens 81.

As illustrated in FIGS. 11 and 12B, the third lens portion 84 is concavely formed on the other surface S3b to have a substantially curved cylindrical refractive surface 84a in its lateral cross section. The refractive surface 84a extends horizontally entirely to pass through the center of the one surface S3b with a predetermined width wider than that of the refractive surface 82a of the first lens portion 82.

As illustrated in FIG. 12C, the third lens portion 84 has a predetermined curvature smaller than that of the first lens portion 82, in other words, the radius of curvature of the refractive surface 84a of the third lens portion 84 is longer than that of curvature of the refractive surface 82a of the first lens portion 82.

Like the first embodiment, the marker beam irradiating device is provided with the laser diode 33, the collective lens 34, the pattern forming lens 81, the imaging lens 36, and the lens aperture 37, which are coaxially aligned at the laser-beam output side (reading window side) of the laser diode 33 in this order with predetermined intervals.

When the laser beam L1 is collected by the collective lens 34 to be entered into the entrance surface S3b of the pattern forming lens 81, a beamlet of the laser beam L1, which is entered into the third lens portion 84, is dispersed. The dispersed beam L1 is entered into the whole of the first lens element 82 and each of the second lens elements 83.

Thereafter, a beamlet entered into the first lens portion 82 is refracted by the refractive surface 82a thereof so that the refracted beamlet having a shape and beam width mainly corresponding to those of the horizontal line pattern element M3a is transferred to be incident into the imaging lens 36.

A beamlet of the laser beam L1, which is entered into each of the second lens portion 83, 83, is refracted by each of the refractive surfaces 83a, 83a thereof. The refracted beamlets each having a shape and beam width mainly corresponding to those of each of the horizontal line pattern elements M3b and M3c is transferred to be incident into the imaging lens 36.

As described above, in the structure of the third embodiment, the pattern forming lens 81 is formed at the entrance surface with the third lens portion 84, and as the output surface with the first and second lens elements 82 and 83. This structure allows the third lens portion 84 to disperse the laser beam entered therethrough into the entrance surface of the pattern forming lens 81, which permits the dispersed laser beam to enter the whole of the refractive surface 82a of the first lens portion 82 and the refractive surfaces 83a, 83a of the second lens portions 83, 83.

That is, in the third embodiment, it is possible to use the major portion of the pattern forming lens 81 to form the beam pattern of the marker beam M3. This allows a loss of the amount of laser beam to comparatively decrease, thereby increasing the brightness of the marker beam M3 irradiated on the target R.

Moreover, the third lens portion 84 formed on the entrance surface S3b of the pattern forming lens 81 allows the curvature of the first lens portion 82 and that of each of the second lens portions 83, 83 to be greatly different from each other. This makes it possible to further effectively use the laser beam incident into the pattern forming lens 81.

Furthermore, the third lens portion 84 allows the width of the refractive surface 82a of the first lens portion 82 and that of each of the refractive surfaces 83a of each of the second lens portions 83, 83 to be greatly different from each other. This makes it possible to further effectively use the laser beam incident into the pattern forming lens 81.

Figure 13A:
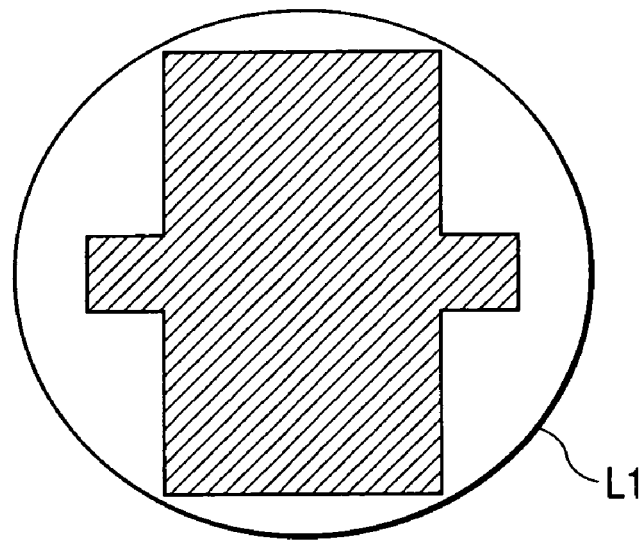
FIG. 13A is a view schematically illustrating part of a laser beam entered into the entrance surface of the pattern forming lens according to the fifth embodiment; this part of the laser beam is effective to form a marker beam, represented by hatching.
Figure 13B:
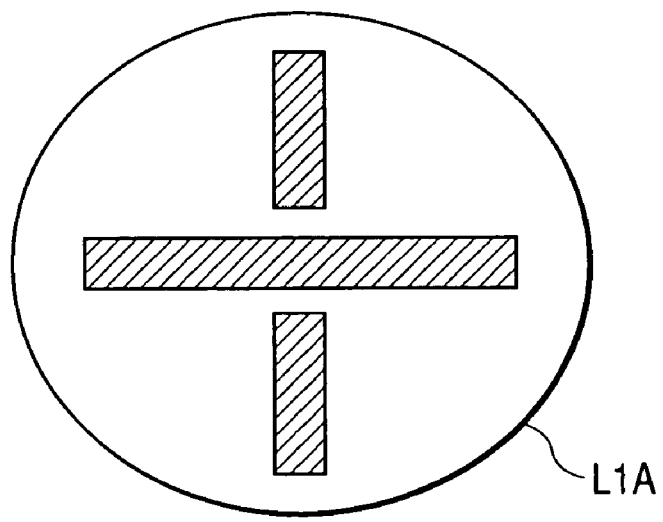
FIG. 13B is a view schematically illustrating part of a laser beam corresponding to a cross-shaped lens portion formed on only an output surface of a pattern forming lens; this part of the laser beam is illustrated by hatching.

For example, FIG. 13A illustrates part of the laser beam L1 collected by the collective lens 34 to be entered into the entrance surface S3b of the pattern forming lens 81; this part of the laser beam L1 is effective to form the marker beam M3, represented by hatching.

Specifically, in the pattern forming lens 81 according to the fifth embodiment, it is possible to use the most part of the laser beam L1 for forming the marker beam M3. This allows efficiency of using the laser beam to increase, as compared with the use of part of the laser beam L1A corresponding to a cross-shaped lens portion formed on only the output surface of a pattern forming lens; this part of the laser beam L1A is illustrated by hatching in FIG. 13B.

As described above, in the fifth embodiment, like the first embodiment, it is possible to clearly irradiate the marker beam M3 composed of the horizontally extending liner beam pattern M3a and each of the liner beam patterns M3b and M3c extending orthogonal to the liner beam pattern M3a. In addition, it is possible to effectively use the laser beam incident into the pattern forming lens 81.

Figure 14:
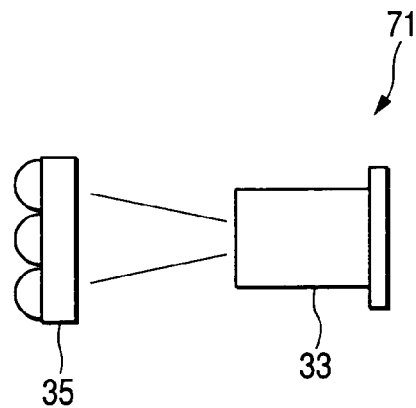
FIG. 14 is a view schematically illustrating the structure of a marker beam irradiating device according to a modification of each of the first to fifth embodiments of the present invention.
Figure 15:
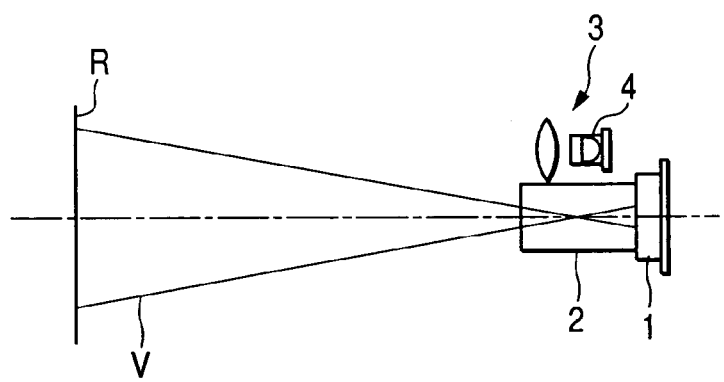
FIG. 15 is a view schematically illustrating an arrangement of a marker beam irradiating device of a conventional optical information reader.
Figure 16:
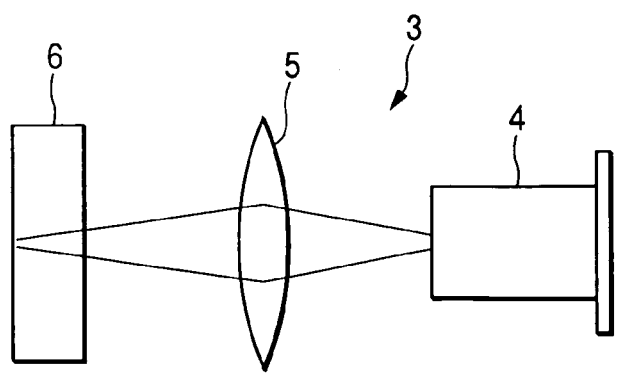
FIG. 16 is a view schematically illustrating the structure of the marker beam irradiating device illustrated in FIG. 15.
Figure 17:
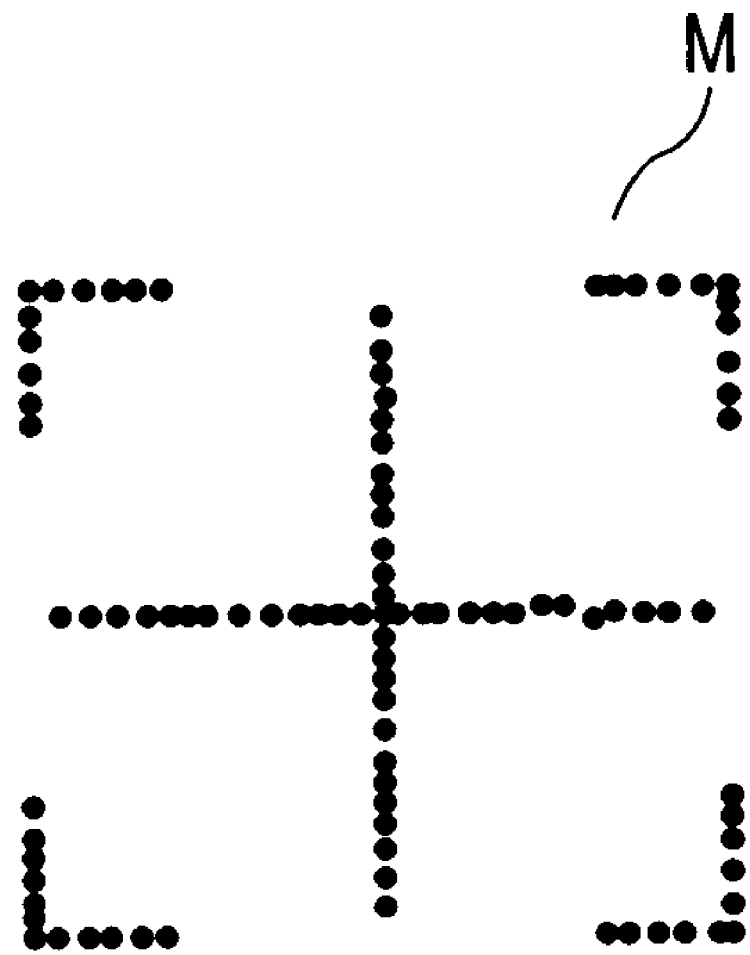
FIG. 17 is a view schematically illustrating the pattern shape of a predetermined marker beam pattern on a target, which is formed by the marker beam irradiating device illustrated in FIG. 16.

In each of the embodiments and their modifications, each of the marker beam irradiating devices 16 (41, 61) is provided with the collective lens 34 (42) and the imaging lens 35, but the present invention is not limited to the structure. Specifically, as illustrated in FIG. 14, a marker beam irradiating device 71 according to a modification of each embodiment can be configured to cause the diffused laser beam emitted from the laser diode 33 to directly enter into the pattern forming lens 35 (42), thereby clearly irradiating the marker beam based on the entered laser beam on the target R. This structure of the modification allows the marker beam to be clearly illustrated.

In each of the first to fifth embodiments and their modifications, the present invention is applied to a gun-shaped two-dimensional code reader, but the present invention is not limited to the structure of each of the first to fifth embodiments. That is, an optical information reader according to the present invention may have another structure, such as a hand-held structure.

The beam patterns of the marker beam can be widely changed. For example, a rectangular or square frame-shape corresponding to the FOV of the photodetector 3 can be used as the beam pattern of the marker beam. In addition, a plurality of cross shaped pattern elements, which indicate the center, and one and the other lateral (or longitudinal) end portions of the FOV, respectively, can be used as the beam pattern of the marker beam. In addition, the lens aperture can be provided in the marker beam irradiating devices according to the first to fifth embodiments if needed, so that the lens aperture can be omitted if the devices do not need it.

Note that, in the first to fifth embodiments and their modifications, the term of "lens and/or lens element(s)" conceptually includes any optical members made of translucent material(s) and designed to optically act on light incident thereto.

While there has been described what is at present considered to be these embodiments and modifications of the present invention, it will be understood that various modifications which are not described yet may be made therein, and it is intended to cover in the appended claims alt such modifications as fall within the true spirit and scope of the invention.

What is claimed is:

1. An optical information reading apparatus comprising: a pickup unit having a predetermined reading field and configured to optically read an information code from a target when the information code is located in the reading field; and a marker beam irradiating unit comprising:

a light beam source configured to emit a diffused light beam;

a collective lens arranged at a diffused light beam emitting side of the light beam source and configured to collect the diffused light beam emitted from the light beam source;

a beam pattern forming lens arranged such that the collected light beam enters into the beam pattern forming lens, the beam pattern forming lens being configured to irradiate a marker beam based on the collected light beam, the marker beam having a predetermined beam pattern composed of at least one linear beamlet to indicate the reading position of the pickup unit; and an imaging lens arranged between the beam pattern forming lens and the target and configured to form a marker beam image on the target based on the marker beam with the predetermined beam pattern, wherein the marker beam indicates the reading field without reading the information code, and wherein the pickup unit reads the information code, and wherein the diffused light beam emitted from the light beam source has a substantially prolate ellipsoid profile in a first direction orthogonal to an optical axis of the light beam source, and the collective lens has an output surface facing the beam pattern forming lens, the output surface being concavely curved in a second direction orthogonal to the optical axis and the first direction, the output surface of the collective lens collecting the diffused light beam emitted from the light beam source incident into the collective lens so that the collected light beam is substantially circular in a lateral cross section thereof.

2. An optical information reading apparatus according to claim 1, wherein the pattern forming lens has at least one lens element having a substantially cylindrical refractive surface and arranged to correspond to the beam pattern, a radius of curvature at each position on the refractive surface of the at least one lens element being changed depending on a distance between each position on the refractive surface and a position of the light beam source from which the light beam is emitted.

3. An optical information reading apparatus according to claim 2, wherein the refractive surface of the at least one lens element allows the emitted light beam entered thereinto to be refracted, the refracted light beam having a shape and a width corresponding to those of the at least one linear beamlet of the beam pattern.

4. An optical information reading apparatus according to claim 1, wherein the reading position of the pickup unit is a field of view thereof, the field of view has a predetermined center position corresponding to an optical axis of the pickup unit and a predetermined shape, the beam pattern has a plurality of pattern elements arranged to identify at least one of the center position of the field of view and the shape thereof, and wherein the pattern forming lens has a plurality of lens elements each having a substantially cylindrical refractive surface, the lens elements being arranged to correspond to the pattern elements of the beam pattern, respectively.

5. An optical information reading apparatus according to claim 1, wherein:
the collective lens is arranged between the light beam source and the beam pattern forming lens and configured to collect the diffused emitted light beam so that the collected light beam is incident into the beam pattern forming lens, and
the imaging lens is coaxially aligned with the collective lens and arranged to be opposite to the beam pattern forming lens with a predetermined interval.

6. An optical information reading apparatus according to claim 1, wherein the marker beam irradiating unit further comprises an aperture coaxially aligned with the light beam source and arranged to be opposite to the beam pattern forming lens with a predetermined interval.

7. An optical information reading apparatus according to claim 1, wherein the light beam source is arranged such that a distance between a position of the light beam source from which the light beam is emitted and a principal point of the beam pattern forming lens exceeds a focal length of the beam pattern forming lens.

8. An optical information reading apparatus according to claim 1, wherein the marker beam pattern has a cross-shaped pattern element along first and second directions, the cross-shaped pattern element indicating a center of the reading position, and the pattern forming lens has a substantially hemispherical shaped lens element arranged to correspond to a center of the cross-shaped pattern element, a first pair of cylindrical lens elements arranged along one of the first and second directions to surround the hemispherical shaped lens element, and a second pair of cylindrical lens elements arranged along the other of the first and second directions to surround the hemispherical shaped lens element.

9. An optical information reading apparatus according to claim 1, wherein the beam pattern has a cross-shaped pattern element along first and second directions, the cross-shaped pattern element indicating a center of the reading position, and the pattern forming lens has a linear element arranged along one of the first and second directions to correspond to a center of the cross-shaped pattern element, and a pair of cylindrical lens elements arranged along the other of the first and second directions to surround the linear element.

10. An optical information reading apparatus according to claim 5, wherein the collective lens is configured and arranged to collect the light beam emitted from the light beam source such that the marker beam irradiated from the beam pattern forming lens and entered into the imaging lens corresponds to an entrance pupil of the imaging lens.

11. An optical information reading apparatus according to claim 5, wherein the collective lens is configured to collect the light beam emitted from the light beam source in a substantially circular profile in a lateral cross section thereof.

12. An optical information reading apparatus according to claim 11, wherein the pickup unit comprises an area sensor with a predetermined aspect ratio, and a ratio of length of the profile in a horizontal direction to that thereof in a vertical direction is substantially equal to the aspect ratio, the horizontal direction and the vertical direction corresponding to horizontal and vertical directions of the area sensor, respectively.

13. An optical information reading apparatus according to claim 1, wherein the beam pattern forming lens has an entrance surface opposite to the light beam source and an output surface opposite to the entrance surface, the beam pattern forming lens being formed at the entrance surface with at least one entrance-side lens portion and at the output surface with at least one output-side lens portion, the at least one entrance-side lens portion and the at least one output-side lens portion having substantially cylindrical refractive surfaces, respectively, and being arranged to correspond to the beam pattern of the marker beam.

14. An optical information reading apparatus according to claim 13, wherein the beam pattern is composed of a first linear pattern extending along a first direction, and a second linear pattern extending along a second direction orthogonal to the first direction.

15. An optical information reading apparatus according to claim 14, wherein the output-side lens portion comprises a first lens portion configured to form the first linear pattern and a second lens portion configured to form the second linear pattern, and curvature of the refractive surface of the first lens portion is different from that of the refractive surface of the second lens portion.

16. An optical information reading apparatus according to claim 14, wherein the beam pattern forming lens is configured such that the output-side lens portion and the entrance-side lens portion form the first linear pattern, and the output-side lens portion forms the second linear pattern.

17. An optical information reading apparatus according to claim 14, wherein the first and second linear patterns have a same pattern width.

18. An optical information reading apparatus according to claim 1, wherein the pickup unit comprises an area sensor with a predetermined aspect ratio, and a ratio of length of the circular profile of the diffused light beam by the light beam source in the first direction to length of the circular profile of the diffused light beam in the second direction is substantially equal to the aspect ratio, the first and second directions corresponding to horizontal and vertical directions of the area sensor, respectively.

* * * * *